United States Patent
Klein et al.

(10) Patent No.: US 10,650,161 B2
(45) Date of Patent: May 12, 2020

(54) DATA PROTECTION MANAGEMENT SYSTEM COMPLIANT IDENTIFICATION HANDLING

(71) Applicant: SAP SE, Walldorf (DE)

(72) Inventors: Udo Klein, Nussloch (DE); Michael Kusber, Potsdam (DE)

(73) Assignee: SAP SE, Walldorf (DE)

( * ) Notice: Subject to any disclaimer, the term of this patent is extended or adjusted under 35 U.S.C. 154(b) by 352 days.

(21) Appl. No.: 15/863,140

(22) Filed: Jan. 5, 2018

(65) Prior Publication Data

US 2019/0213350 A1    Jul. 11, 2019

(51) Int. Cl.

| | |
|---|---|
| *G06F 21/62* | (2013.01) |
| *H04L 9/06* | (2006.01) |
| *H04L 9/08* | (2006.01) |
| *H04L 9/32* | (2006.01) |
| *G06F 21/64* | (2013.01) |
| *G06F 16/951* | (2019.01) |
| *G06F 16/22* | (2019.01) |
| *H04L 29/06* | (2006.01) |
| *G06F 7/58* | (2006.01) |

(52) U.S. Cl.
CPC ...... *G06F 21/6227* (2013.01); *G06F 16/2282* (2019.01); *G06F 16/951* (2019.01); *G06F 21/6245* (2013.01); *G06F 21/64* (2013.01); *H04L 9/0643* (2013.01); *H04L 9/0656* (2013.01); *H04L 9/0869* (2013.01); *H04L 9/3297* (2013.01); *G06F 7/582* (2013.01); *H04L 63/083* (2013.01); *H04L 63/0884* (2013.01); *H04L 2209/08* (2013.01)

(58) Field of Classification Search
CPC .. G06F 21/6227; G06F 21/6245; G06F 21/64; G06F 16/2282; G06F 16/951; G06F 7/582; H04L 9/0643; H04L 9/0656; H04L 9/0869; H04L 9/3297; H04L 2209/08; H04L 63/083; H04L 63/0884
See application file for complete search history.

(56) References Cited

U.S. PATENT DOCUMENTS

| | | | | |
|---|---|---|---|---|
| 6,463,533 B1 * | 10/2002 | Calamera | .......... | H04L 29/12009 713/163 |
| 7,870,614 B1 * | 1/2011 | Duhaime | ............ | G06Q 20/383 726/28 |
| 9,460,298 B1 * | 10/2016 | Duhaime | ............ | G06Q 20/383 |
| 9,460,310 B2 * | 10/2016 | Butler | ................. | G06F 21/6245 |

(Continued)

OTHER PUBLICATIONS

Kvet et al., "Temporal transaction integrity constraints management", Jan. 2017, Springer Science+Business Media New York, pp. 673-688. (Year: 2017).*

*Primary Examiner* — Hee K Song
(74) *Attorney, Agent, or Firm* — Jones Day

(57) ABSTRACT

An alias key is generated for each person identification (ID) in a database table. The alias key us used to lookup the corresponding person ID in the database table. In addition, for each alias key, a temporary alias key is generated that is used to lookup the corresponding alias key in the database table. A plurality of queries are received from at least one remote client that each specify at least one of the temporary alias keys. Data is later transmitted to the at least one remote client that is responsive to the queries. Related apparatus, systems, techniques and articles are also described.

19 Claims, 5 Drawing Sheets

(56) References Cited

U.S. PATENT DOCUMENTS

| | | | | |
|---|---|---|---|---|
| 9,934,409 B2 * | 4/2018 | Cuthbertson | ....... | H04L 63/0407 |
| 2007/0169202 A1 * | 7/2007 | Goldberg | ................ | G06F 21/31 |
| | | | | 726/26 |
| 2008/0114991 A1 * | 5/2008 | Jonas | .................. | G06F 21/6245 |
| | | | | 713/193 |
| 2008/0147554 A1 * | 6/2008 | Stevens | ............... | G06F 21/6254 |
| | | | | 705/51 |
| 2010/0027780 A1 * | 2/2010 | Jung | ...................... | G06Q 10/10 |
| | | | | 380/28 |
| 2011/0010563 A1 * | 1/2011 | Lee | .................... | G06F 21/6254 |
| | | | | 713/189 |
| 2016/0306999 A1 * | 10/2016 | Beinhauer | ........... | G06F 21/6254 |
| 2017/0039568 A1 * | 2/2017 | Tunnell | .............. | G06Q 20/4014 |
| 2018/0053182 A1 * | 2/2018 | Mokhasi | ............... | H04L 63/126 |

* cited by examiner

DATA PROTECTION MANAGEMENT SYSTEM COMPLIANT IDENTIFICATION HANDLING

TECHNICAL FIELD

The subject matter described herein relates to the handling of sensitive information including identifications within a data protection management system.

BACKGROUND

The handling of data is becoming increasingly important both from privacy standpoints as well as general cybersecurity reasons. The upcoming EU General Data Protection Regulation (EU-GDPR) is an example of such increased focus on data handling that has sparked significant software/computer system development activity with the goal of establishing GDRP compliance. Such activity is largely driven by the enormous administrative fines the GDPR provides for violations.

SUMMARY

In one aspect, an alias key is generated for each person identification (ID) in a database table. The alias key is used to lookup the corresponding person ID in the database table. In addition, for each alias key, a temporary alias key is generated that is used to lookup the corresponding alias key in the database table. A plurality of queries are received from at least one remote client that each specify at least one of the temporary alias keys. Data is later transmitted to the at least one remote client that is responsive to the queries.

The alias keys can be generated by inputting a different secure random number assigned to each alias key with the corresponding alias key into an encryption function. Alternatively, the alias keys can be generated by inputting a different secure random number assigned to each alias key with a concatenation of padding and the corresponding alias key into an encryption function. The padding can include a time stamp indicating a validity window for the corresponding temporary alias key, a checksum or hash function of the corresponding alias key and/or a fixed constant.

The padding within keys in each query can be checked to confirm the validity of the corresponding keys.

A validity window for each temporary alias key can be specified in the database table.

The database can be an in-memory database.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter enables the control of keys over their lifetime on a key by key basis while, at the same time, allowing for compliance with various data privacy laws and regulations. Further, the current subject matter is advantageous as it does not degrade the effectiveness of the database.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
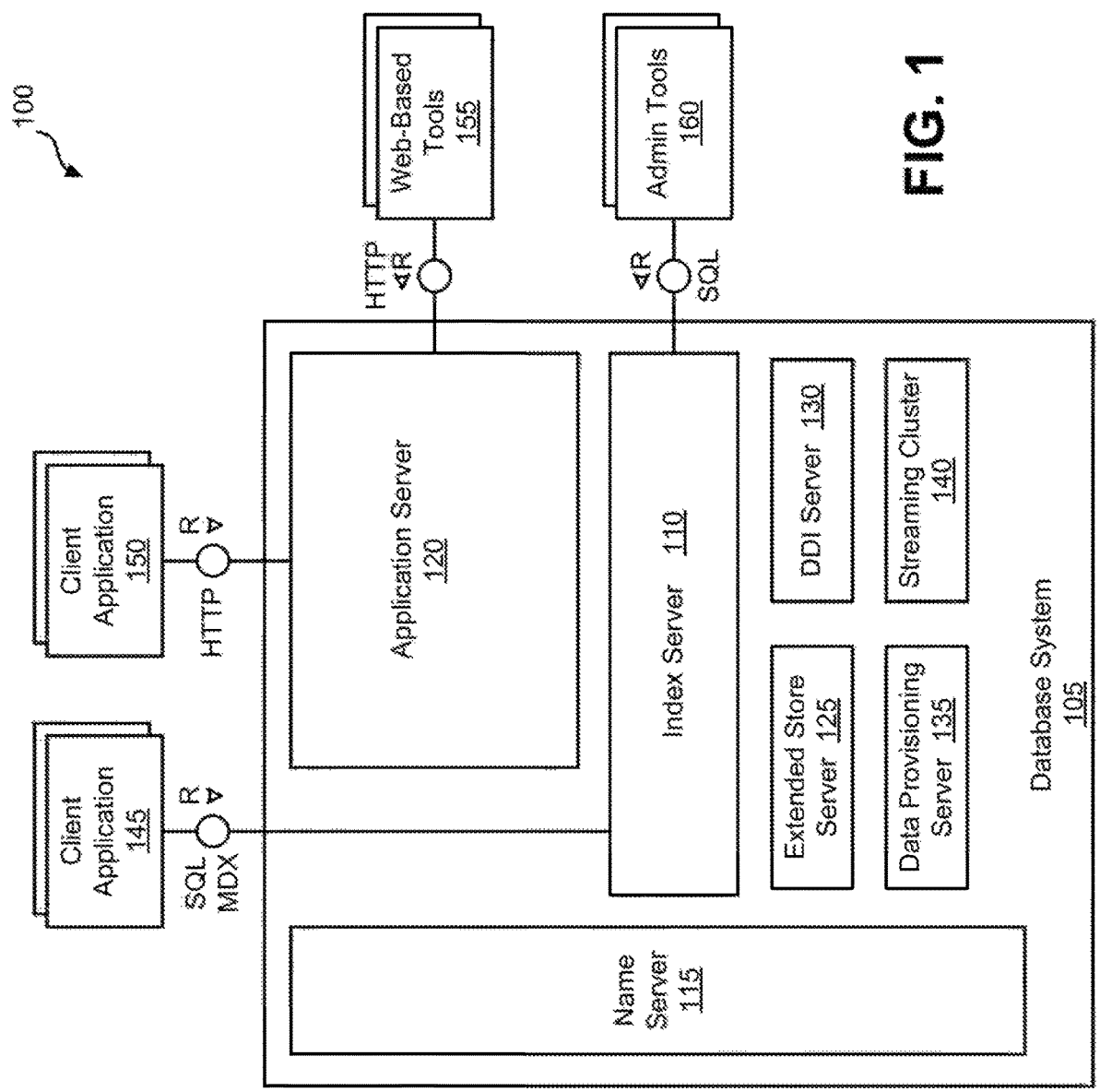
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also be used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
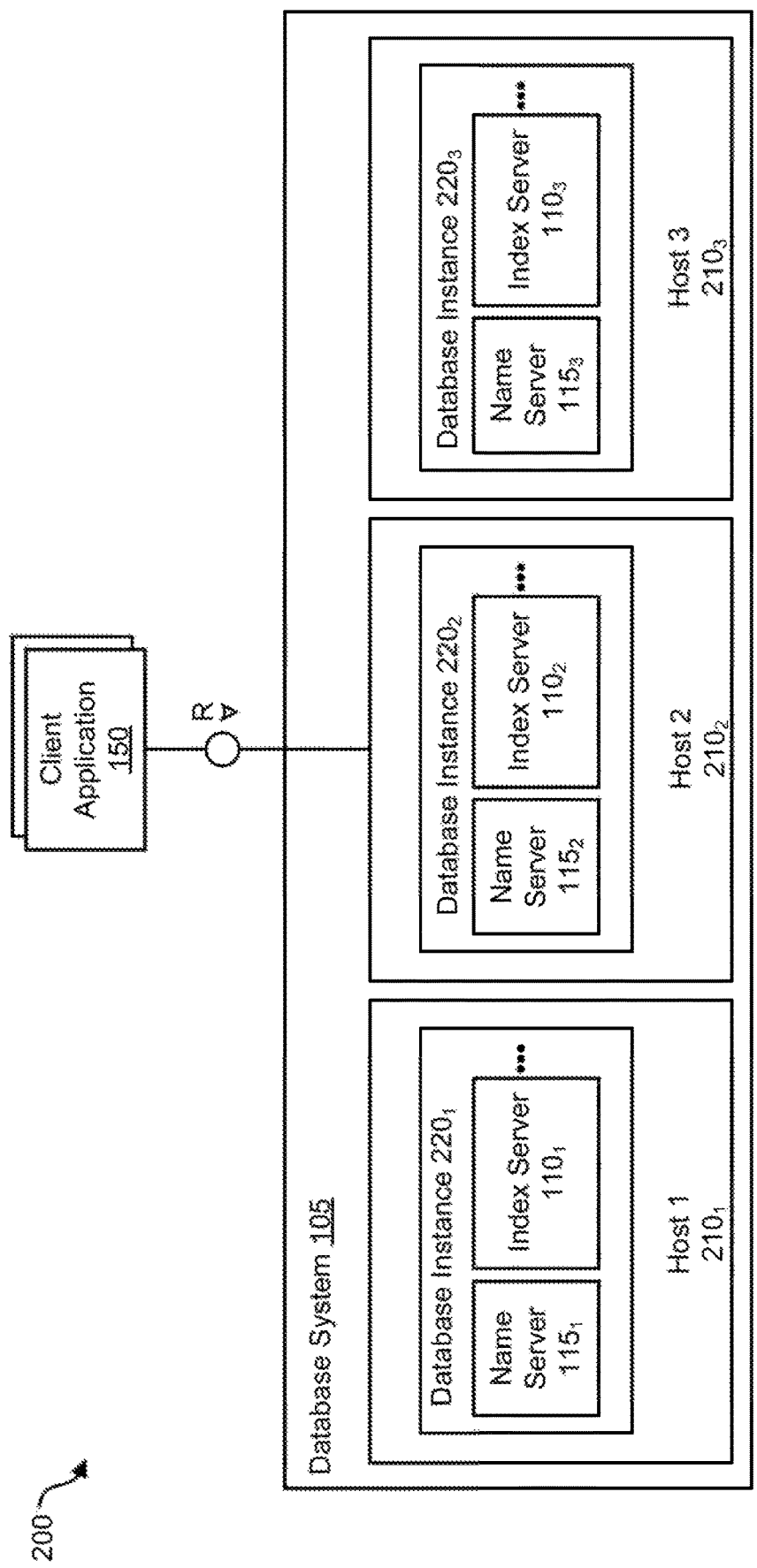
FIG. 2 is a system diagram illustrating a distributed database system having a plurality of database instances.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
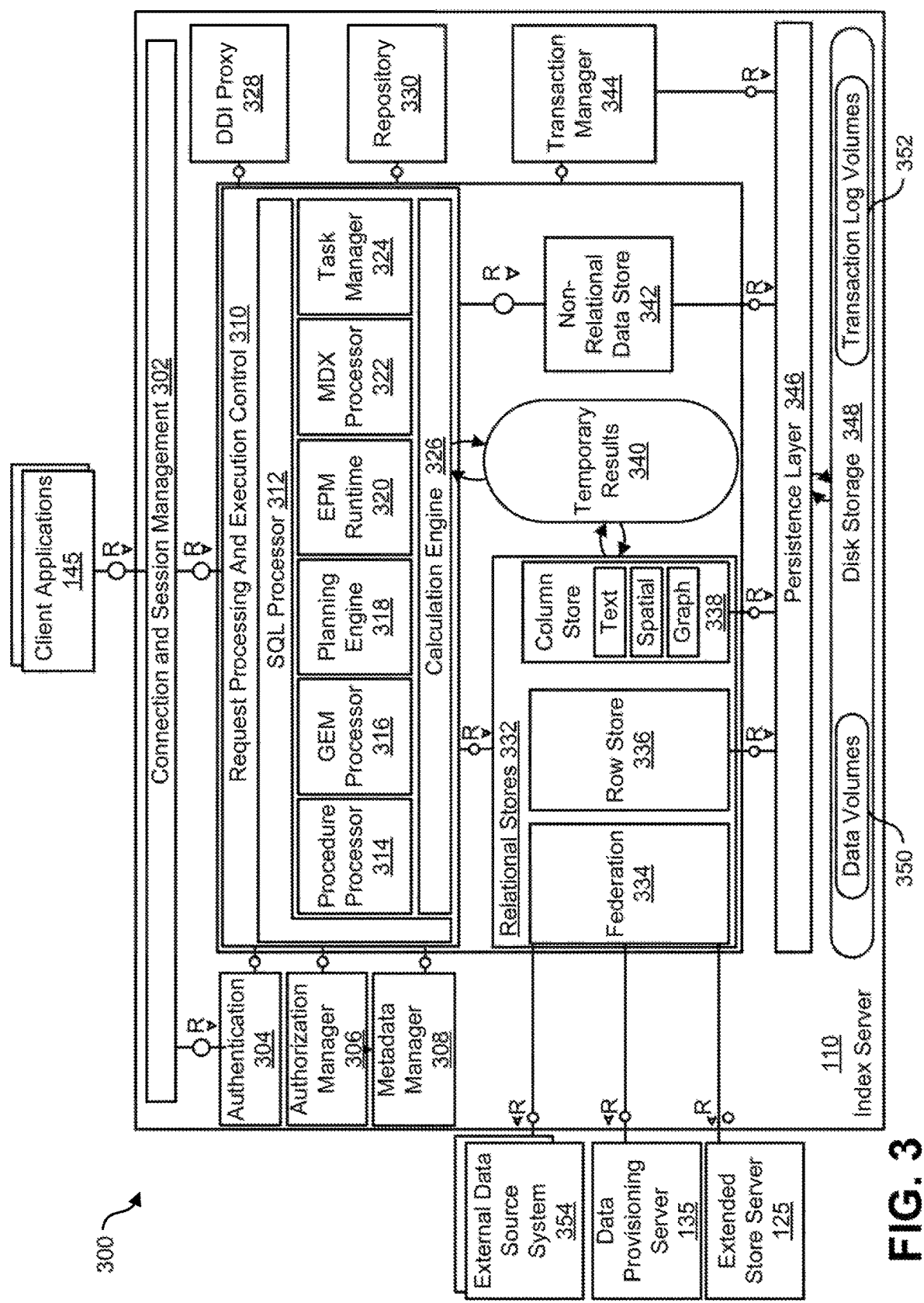
FIG. 3 is a system diagram of an index server forming part of the database system of FIG. 1.

FIG. 3 is a diagram 300 illustrating an architecture for the index server 110 (which can, as indicated above, be one of many instances). A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 145 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can be forwarded to a task manager 324 (which can be part of a larger task framework) Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persisted data and it can also contain a logger component that manages a transaction log. Transaction log entries can be written explicitly by using a log interface or implicitly when using the virtual file abstraction.

The persistence layer 236 stores data in persistent disk storage 348 which, in turn, can include data volumes 350 and/or transaction log volumes 352 that can be organized in pages. Different page sizes can be supported, for example, between 4 k and 16M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

The database system 105 can store data in normalized or almost normalized forms. In many cases in which employee/customer data is stored in the database system 105, there is masterdata that is suitable to identify such persons. For example there may be a PersonID. This PersonID is often a primary key or a secondary index used to access the masterdata of the person in the database system 105 such as his or her name, address and other relevant information.

Whenever an application or part of it utilizes this masterdata, the application typically only stores the key (i.e. the PersonID, etc.). As soon as the data is needed, the database system 105 can use the key to retrieve the actual data. No matter what the masterdata is used for all applications will usually refer to it by the same ID. With such an arrangement, the masterdata cannot be deleted because it may be needed by other parts of the application. For example, certain data may be requested to be erased while at the same time it is legally required to keep the data for another purpose.

An alternative approach could be to adopt flags that indicate acceptable uses for the data. However, this arrangement requires changes to the (flag) data structure of the masterdata each time in which a new use of such data is adopted.

In order to decouple the keys, the current subject matter utilizes a redirection for person-related IDs such as a PersonID. That, is for each application that processes person related data for a different reason, a different and dedicated alias ID can be utilized. Depending on the desired database layout (of, for example, the database system 105), the aliases can be stored in one shared table or in dedicated application tables.

For example, for a software-implemented solution that wants to access customer data (e.g., person data) for the purpose of (i) shipment of a product and for (ii) online or or e-mail advertising, these two uses can be separated with different dedicated alias IDs for such person. In this example, the person masterdata can only include the PersonID as primary key and the Name column.

TABLE 1

| Masterdata | |
|---|---|
| PersonID | Name |
| P1 | Peter |
| P2 | Mary |
| P3 | <deleted> |

By having "dedicated alias tables" in the database system 105, there an be two alias tables for aliases. One table (Table 2) is for the use with the shipment aspect, the other table (Table 3) for use with advertising aspects.

TABLE 2

| Aliases for Shipment | |
|---|---|
| AliasID | PersonID |
| A1 | P1 |
| A2 | P2 |

TABLE 3

| Aliases for Advertising | |
|---|---|
| AliasID | PersonID |
| A3 | P1 |
| A4 | P2 |

As an alternative to separate alias tables, a shared alias table can be as provided in Table 4 below.

TABLE 4

| Combined Alias Table | | |
|---|---|---|
| ApplicationPurpose | PersonAliasID | PersonID |
| Shipment | A1 | P1 |
| Shipment | A2 | P2 |
| Advertising | A3 | P1 |
| Advertising | A4 | P2 |

No matter how the actual table layout (i.e., whether separate tables or a combined alias table), the handling will be similar. If an application requires access to a specific PersonID a dedicated alias will be generated (either in one of the Tables 2 or 3) or in Table 4 with a suitable purpose. Once the alias is generated it will not be changed anymore. The application can then use the alias instead of the original key. For example it will use the alias A1 instead of the original key P1 in the context of "Shipment".

As another example, suppose that there is a requirement to delete person related data of person P1 ("John"). If the deletion is really for all purposes, all of the data stored in Table 1 relating to P1 can be removed. That is, either the record with key P1 is deleted, the name "John" is deleted by the special value "null", or the record is deleted with some other dedicated value, e.g. "deleted". As most applications are poor at handling dangling references or "null" values, it can sometimes be preferable to replace the data by something that indicates deletion, e.g. the string "deleted".

If on the other hand, there is a requirement for deleting person related data of person P1 ("John") for advertising purposes while keeping it for shipment purposes, the corresponding Alias A3 can be removed. Again, there is a choice to remove the entry in the Alias table, to overwrite the PersonID with "null" or repoint it to some generic entry "deleted" entry. That is, the PersonID for record A3 can be overwritten by P3.

Issues can arise with the above techniques when the alias key becomes, in effect, a PersonID. This situation does not pose any issue if this ID is never processed outside the system. Unfortunately most user interfaces require some handle for the data and the typical application approach is to use exactly those IDs. This is still not an issue if the IDs are never displayed to the users. Thus, application developers hide them in the user interface and assume everything is fine.

Unfortunately there is no way to stop users from debugging the user interface or inspecting its memory. This is in particular true for modern browser based user interfaces. Hence technically sophisticated users can learn about these IDs. That is, a user may learn to which person alias A1 is pointing. Later on when A1 is repointed to <deleted> this user can still infer who the person was.

Once this information is delivered to the user interface there is no way to prevent a user from figuring out this connection over and over again.

In order to prevent key leakage as described above, the user interface can be prevented from ever using the real interfaces. Rather, there are temporary alias keys for the purpose of user interaction. For any given alias there may be any number of temporary alias keys. From a security point of view, it is be best to answer each query with a new alias. However this has arrangement has performance penalties. In particular, this arrangement circumvents any caching mechanism and it consumes additional processing resources, etc.

Therefore, a validity window (e.g., 12 hours, etc.) can be specified for the temporary aliases. As one example, the temporary aliases are 12 hours which is longer than a typical workday but short enough to ensure that keys will be become useless every other day.

In one variation, a secure pseudo random number generator (SPRNG) can generate system wide secret keys "S" which will be valid for 12-16 hours. Any data alias key A will then be just encrypted with S. That is, instead of A the server (conceptually) will pass B:=encrypt(A, S) to the user interface. Whenever keys are received from the user interface the server will process A=decrypt(B, S). Such keys can be generated on a rolling basis or alternatively on demand in response to a request/query.

The advantage of this approach is that the server does not need to store any key mapping tables. The disadvantage is that there are specific points in time where the secret keys get replaced. For those periods the server needs to process both $A_1$=decrypt(B, $S_{old}$) as well as $A_2$=decrypt(B, $S_{new}$). The issue becomes then to figure out if $A_1$ or $A_2$ is the proper key alias. To remedy this issues, A can be padded before encryption. The padding can encapsulate a checksum or hash function of A, it may be a fixed constant, and/or or it may be a timestamp indicating a window of validity.

The key generation procedure can be as follows:
B:=encrypt(concatenate(A, padding), S)
The key extraction mechanism can be as follows:
A=check_and_strip_padding(decrypt(B, S))

The function check_and_strip_padding can throw an error in case the decrypted data has invalid padding. Now if the server key S is changed, the server can use the old and new keys to determine $A_1$ = check_and_strip_padding(decrypt(B, $S_{old}$))
$A_2$ = check_and_strip_padding(decrypt(B, $S_{new}$))

Obviously for one of the two keys the padding will be properly decrypted and for the other this will fail. As a consequence it is clear which of the two decrypted aliases is the desired key.

Another variation is to generate transient alias keys using an SPRNG and store them in a mapping table such as in Table 5. Whenever a key is to be mapped, a table lookup can be performed. In particular for in-memory data bases such as those described above, it is convenient to store this in an in memory transient table. That way the lookup (in both directions) can be combined with a DB join operation for enhanced performance.

TABLE 5

Alias Table with Validity Windows

| TemporaryAliasID | ValidTill | AliasID |
|---|---|---|
| TA1 | DateTime1 | A1 |
| TA2 | DateTime2 | A1 |
| TA3 | DateTime3 | A2 |
| TA4 | DateTime4 | A2 |

Figure 4:
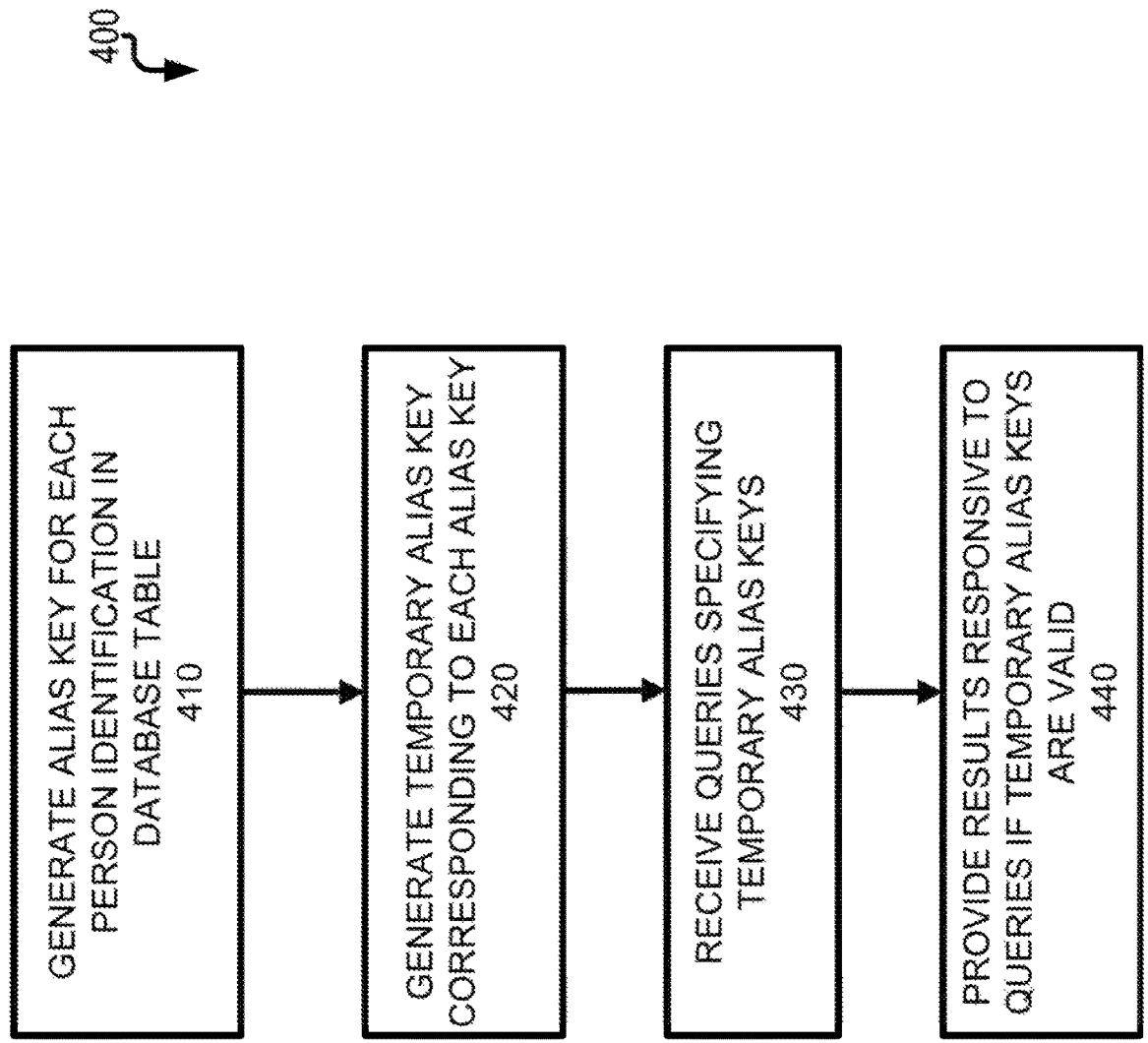
FIG. 4 is a process flow diagram illustrating identification handling in a data protection management system.

FIG. 4 is a process flow diagram illustrating protection of sensitive data in a database in which, at 410, an alias key is generated for each person identification (ID) in a database table that is used to lookup the corresponding person ID in the database table. Thereafter, at 420, a temporary alias key is generated for each alias key that is used to lookup the corresponding alias key in the database table. Later, at 430, a plurality of queries are received from at least one remote client that each specify at least one of the temporary alias keys. In response to such queries, at 440, data responsive to the plurality of queries can be transmitted to the at least one remote client.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 5:
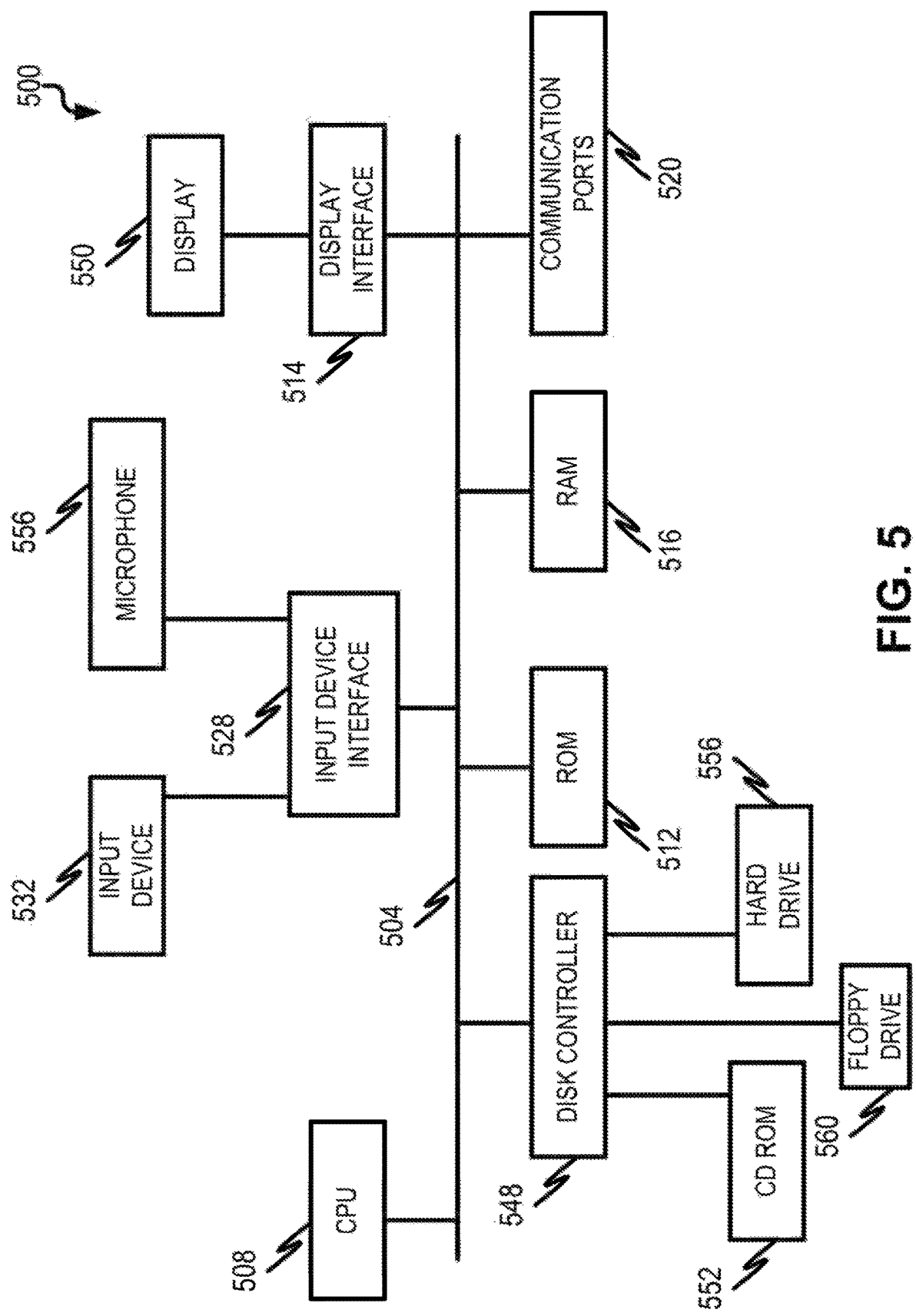
FIG. 5 is a schematic diagram illustrating a computing device for implementing aspects described herein.

FIG. 5 is a diagram illustrating a sample computing device architecture for implementing various aspects described herein. A bus 504 can serve as the information highway interconnecting the other illustrated components of the hardware. A processing system 508 labeled CPU (central processing unit) (e.g., one or more computer processors/data processors at a given computer or at multiple computers), can perform calculations and logic operations required to execute a program. A non-transitory processor-readable storage medium, such as read only memory (ROM) 512 and random access memory (RAM) 516, can be in communication with the processing system 508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 548 can interface one or more optional disk drives to the system bus 504. These disk drives can be external or internal floppy disk drives such as 560, external or internal CD-ROM, CD-R, CD-RW or DVD, or solid state drives such as 552, or external or internal hard drives 556. As indicated previously, these various disk drives 552, 556, 560 and disk controllers are optional devices. The system bus 504 can also include at least one communication port 520 to allow for communication with external devices either physically connected to the computing system or available externally through a wired or wireless network. In some cases, the communication port 520 includes or otherwise comprises a network interface.

To provide for interaction with a user, the subject matter described herein can be implemented on a computing device having a display device 540 (e.g., a CRT (cathode ray tube) or LCD (liquid crystal display) monitor) for displaying information obtained from the bus 504 to the user and an input device 532 such as keyboard and/or a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback by way of a microphone 536, or tactile feedback); and input from the user can be received in any form, including acoustic, speech, or tactile input. In the input device 532 and the microphone 536 can be coupled to and convey information via the bus 504 by way of an input device interface 528. Other computing devices, such as dedicated servers, can omit one or more of the display 540 and display interface 524, the input device 532, the microphone 536, and input device interface 528.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for protecting sensitive data in a database comprising:
   first generating, for each person identification (ID) in a database table, an alias key used to lookup the corresponding person ID in the database table by:
      inputting a different secure random number assigned to each alias key with a concatenation of padding and the corresponding alias key into an encryption function;
   second generating, for each alias key, a temporary alias key used to lookup the corresponding alias key in the database table;
   receiving, from at least one remote client, a plurality of queries that each specify at least one of the temporary alias keys; and
   transmitting data responsive to the plurality of queries to the at least one remote client;
   wherein the padding comprises a time stamp indicating a validity window for the corresponding temporary alias key.

2. The method of claim 1, wherein the padding further comprises a checksum or hash function of the corresponding alias key.

3. The method of claim 1, wherein the padding comprises a fixed constant.

4. The method of claim 1 further comprising:
   checking padding within keys specified in each query to confirm validity of the corresponding keys.

5. The method of claim 1 further comprising specifying, in the database table, a validity window for each temporary alias key.

6. The method of claim 1, wherein the database table is loaded into memory of an in-memory database.

7. The method of claim 1, wherein the first generating, second generating, receiving, and transmitting are performed by at least one programmable data processor forming part of at least one computing device.

8. A system for protecting sensitive data in a database comprising:
   at least one programmable data processor; and
   memory storing instructions which, when executed by the at least one data processor, result in operations comprising:

first generating, for each person identification (ID) in a database table, an alias key used to lookup the corresponding person ID in the database table by:
inputting a different secure random number assigned to each alias key with a concatenation of padding and the corresponding alias key into an encryption function;
second generating, for each alias key, a temporary alias key used to lookup the corresponding alias key in the database table;
receiving, from at least one remote client, a plurality of queries that each specify at least one of the temporary alias keys; and
transmitting data responsive to the plurality of queries to the at least one remote client;
wherein the padding comprises a time stamp indicating a validity window for the corresponding temporary alias key.

9. The system of claim 8, wherein the padding further comprises a checksum or hash function of the corresponding alias key.

10. The system of claim 8, wherein the padding further comprises a fixed constant.

11. The system of claim 8, wherein the operations further comprise:
checking padding within keys specified in each query to confirm validity of the corresponding keys.

12. The system of claim 8, wherein the operations further comprise:
specifying, in the database table, a validity window for each temporary alias key.

13. The system of claim 8 further comprising: a database storing the database table and wherein the database is an in-memory database.

14. A non-transitory computer program product storing instructions which, when executed by at least one programmable data processor forming part of at least one computing system, result in operations comprising:
first generating, for each person identification (ID) in a database table, an alias key used to lookup the corresponding person ID in the database table by:
inputting a different secure random number assigned to each alias key with a concatenation of padding and the corresponding alias key into an encryption function;
second generating, for each alias key, a temporary alias key used to lookup the corresponding alias key in the database table;
receiving, from at least one remote client, a plurality of queries that each specify at least one of the temporary alias keys; and
transmitting data responsive to the plurality of queries to the at least one remote client;
wherein the padding comprises a time stamp indicating a validity window for the corresponding temporary alias key.

15. The computer program product of claim 14, wherein the padding further comprises a checksum or hash function of the corresponding alias key.

16. The computer program product of claim 14, wherein the padding further comprises a fixed constant.

17. The computer program product of claim 14, wherein the operations further comprise:
checking padding within keys specified in each query to confirm validity of the corresponding keys.

18. The computer program product of claim 14, wherein the operations further comprise: specifying, in the database table, a validity window for each temporary alias key.

19. The computer program product of claim 14, wherein a database stores the database table and wherein the database is an in-memory database.

* * * * *